United States Patent
Yamada et al.

(10) Patent No.: US 8,303,760 B2
(45) Date of Patent: Nov. 6, 2012

(54) METHOD AND APPARATUS FOR PRODUCING COMBINED OPTICAL FILM, COMBINED OPTICAL FILM, IMAGE DISPLAY, AND METHODS FOR PRODUCING LIQUID CRYSTAL PANEL AND LAMINATED OPTICAL FILM

(75) Inventors: Taku Yamada, Ibaraki (JP); Satoru Yamamoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 67 days.

(21) Appl. No.: 12/960,930

(22) Filed: Dec. 6, 2010

(65) Prior Publication Data
US 2011/0132532 A1    Jun. 9, 2011

Related U.S. Application Data

(62) Division of application No. 11/932,138, filed on Oct. 31, 2007, now Pat. No. 7,867,354.

(30) Foreign Application Priority Data

Oct. 31, 2006   (JP) ................................. 2006-296172
Aug. 8, 2007    (JP) ................................. 2007-206960

(51) Int. Cl.
  *B29C 65/00*   (2006.01)
  *B32B 43/00*   (2006.01)
  *B23K 37/04*   (2006.01)
(52) U.S. Cl. ...................... 156/304.5; 156/580; 156/750
(58) Field of Classification Search .................... 156/63, 156/212, 216, 217, 304.1, 304.5, 701, 580, 156/750, 764, 443; 428/1.1, 1.5, 1.52, 33, 428/54, 57, 58, 61, 68, 221, 223; 349/187, 349/190, 191, 73
See application file for complete search history.

(56) References Cited

U.S. PATENT DOCUMENTS 3,434,898 A    3/1969 Freedman
(Continued)

FOREIGN PATENT DOCUMENTS

EP    1 813 971 A1    8/2007
(Continued)

OTHER PUBLICATIONS

English Abstract of JP2004-093825.

*Primary Examiner* — Sing P Chan
(74) *Attorney, Agent, or Firm* — Westerman, Hattori, Daniels & Adrian, LLP (57) ABSTRACT

It is an object of the invention to provide a method for producing a combined optical film that includes opposing the end faces of a plurality of optical films to one another and can narrow the gap between the opposed end faces. A method for producing a combined optical film comprising a plurality of optical films each having at least one end face at which the optical films are opposed to one another, comprising the steps of: (1) opposing the end faces of the optical films to one another with a gap provided therebetween; (2) bonding a first seal material to the opposed portions of the optical films on a first side of each optical film to join the optical films; (3) bending the joined opposed portions of the optical films such that the joined opposed portions become concave on a second side of each optical film where the first seal material is not bonded and such that the gap is narrowed on the second side; (4) bonding a second seal material to the opposed portions on the second side, while the joined optical films are bent such that the gap is narrowed on the second side; and (5) cancelling the bending of the joined optical films to make them flat.

4 Claims, 5 Drawing Sheets

U.S. PATENT DOCUMENTS

| | | | |
|---|---|---|---|
| 3,533,891 A | 10/1970 | Puyear | |
| 4,199,538 A * | 4/1980 | Wu | 264/2.3 |
| 4,397,705 A | 8/1983 | Eckert | |
| 4,434,113 A * | 2/1984 | Neefe | 264/2.1 |
| 4,468,268 A | 8/1984 | Ralph | |
| 4,540,456 A | 9/1985 | Kaida et al. | |
| 4,645,558 A | 2/1987 | Sato | |
| 4,750,045 A * | 6/1988 | Ohara et al. | 358/494 |
| 5,078,828 A | 1/1992 | Marglin | |
| 5,320,694 A | 6/1994 | Dietzsch | |
| 5,405,470 A | 4/1995 | Held | |
| 6,129,804 A | 10/2000 | Gaynes et al. | |
| 6,133,969 A | 10/2000 | Babuka et al. | |
| 6,187,127 B1 | 2/2001 | Bolitsky et al. | |
| 6,459,462 B1 | 10/2002 | Seraphim et al. | |
| 6,583,848 B2 | 6/2003 | Hashimoto et al. | |
| 6,841,028 B2 | 1/2005 | Tsukada et al. | |
| 7,011,412 B2 | 3/2006 | Ogawa et al. | |
| 7,678,215 B2 | 3/2010 | Martin et al. | |
| 2001/0038438 A1 * | 11/2001 | Beeloo et al. | 351/162 |
| 2003/0113502 A1 | 6/2003 | Tsukada et al. | |
| 2007/0296890 A1 | 12/2007 | Mizushima et al. | |
| 2008/0099128 A1 * | 5/2008 | Yamada et al. | 156/152 |
| 2009/0186170 A1 | 7/2009 | Yamamoto et al. | |

FOREIGN PATENT DOCUMENTS

| | | |
|---|---|---|
| JP | 5-88163 A | 4/1993 |
| JP | 2004-093825 A | 3/2004 |
| JP | 2006-163377 A | 6/2006 |

* cited by examiner

NUMBER OF PIXELS FROM STARTING POINT

METHOD AND APPARATUS FOR PRODUCING COMBINED OPTICAL FILM, COMBINED OPTICAL FILM, IMAGE DISPLAY, AND METHODS FOR PRODUCING LIQUID CRYSTAL PANEL AND LAMINATED OPTICAL FILM

CROSS-REFERENCE TO RELATED APPLICATIONS

This application is a Divisional of U.S. patent application Ser. No. 11/932,138, filed Oct. 31, 2007, which claims priority of Japan Application No. 2006-296172, filed Oct. 31, 2006 and Japan Application No. 2007-206960, filed Aug. 8, 2007, the entire contents of which are hereby incorporated by reference.

BACKGROUND OF THE INVENTION (1) Field of the Invention

The invention relates to a method for producing a combined optical film including a plurality of optical films with their end faces opposed to one another and to an apparatus for use in the production method. The invention also relates to a combined optical film obtained by the production method. The combined optical film obtained by the production method is suitable for use in methods of producing a liquid crystal panel and a laminated optical film. The invention also relates to an image display, such as a liquid crystal display and an organic electroluminescent display, using the combined optical film.

Examples of the optical film include a polarizer, a protective film to be laminated on one or both sides of a polarizer, a polarizing plate including a polarizer and the protective film laminated on one or both sides of the polarizer, a retardation plate, an optical compensation film, and a brightness enhancement film. Any one of these optical films may be used alone for the combination optical film, or a laminate of any of these optical films may be used for the combination optical film.

The optical films to be used may each include an optical film and an easily-releasable protective film provided on the front surface of the optical film and/or a separator provided on the back surface of the optical film with a pressure-sensitive adhesive layer interposed therebetween.

(2) Description of the Related Art

Image displays such as liquid crystal displays for use in televisions, personal computers and the like use optical films such as polarizing plates. As the size of televisions and the like has grown in recent years, large-area optical films have been demanded. For the manufacture of large-area optical films, corresponding large manufacturing facilities are necessary, and a difficulty in handling for packing is associated with transportation, which requires high cost. In order to install such large manufacturing facilities, a large place is required. Thus, there has been proposed a technique in which a plurality of liquid crystal displays are arranged with their end faces butted against one another to form a large-sized liquid crystal display.

Liquid crystal displays of televisions, personal computers and the like produce a display by transmitting and blocking (absorbing) light from their back side based on the function of optical films such as polarizing plates. Thus, butting of the end faces of liquid crystal displays has a problem in which the butted portion can cause light leakage to produce a light line on the front face of liquid crystal displays. Against this problem, there is disclosed a technique that a film is attached onto polarizing plates (optical film) at the butted portion of liquid crystal displays to prevent light leakage (JP-A No. 05-88163). However, the technique of Patent Literature 1 has a problem in which the film attached to the surface of the polarizing plates can degrade the surface appearance of liquid crystal displays, although light leakage can be prevented. There is also proposed a combined optical film comprising a plurality of optical films with their opposed end faces each controlled to have a specific shape (JP-A No. 2006-163377). Such a combined optical film can prevent light leakage without degrading appearance. It has been desired to narrow the gap between the opposed end faces in such a combined optical film.

SUMMARY OF THE INVENTION

It is an object of the invention to provide a method for producing a combined optical film that includes opposing the end faces of a plurality of optical films to one another and can narrow the gap between the opposed end faces.

It is another object of the invention to provide a combined optical film obtained by the production method and to provide methods for producing a liquid crystal panel and a laminated optical film each using the combined optical film obtained by the production method. It is a further object of the invention to provide an apparatus for use in the production method and to provide an image display using the combined optical film.

As a result of active investigations for solving the above problems, the inventors have found that the objects can be achieved by the combined optical film production method described below and so on and thus have completed the invention.

Thus, the invention is directed to a method for producing a combined optical film including a plurality of optical films each having at least one end face at which the optical films are opposed to one another, including the steps of:

(1) opposing the end faces of the optical films to one another with a gap provided therebetween;

(2) bonding a first seal material to the opposed portions of the optical films on a first side of each optical film to join the optical films;

(3) bending the joined opposed portions of the optical films such that the joined opposed portions become concave on a second side of each optical film where the first seal material is not bonded and such that the gap is narrowed on the second side;

(4) bonding a second seal material to the opposed portions on the second side, while the joined optical films are bent such that the gap is narrowed on the second side; and (5) cancelling the bending of the joined optical films to make them flat.

According to the production method, the gap between the opposed end faces on the first side in the combined optical film is fixed by means of the first seal material in the step (2), while the gap on the second side is open. In the step (3), the optical films are bent so that the gap on the second side is narrowed. In the step (4), the narrowed gap on the second side is also fixed by means of the second seal material. In the step (5), the bending of the optical films is cancelled so that the whole of the gap between the opposed end faces can be narrowed. According to the production method of the invention, therefore, the gap between the opposed portions in the combined optical film can be reduced by a simple process. The resulting combined optical film is less susceptible to appearance degradation and is preferred in order to prevent light leakage. When the combined optical film is used in liquid crystal displays and so on, therefore, degradation in surface appearance and leakage of light applied from backside can be suppressed.

In the production method, the first and second seal materials each preferably have flexibility for the bending of the optical films. In particular, the first seal material preferably has flexibility so that it can be easily bent when the bending of the optical films is cancelled in the step (5) and thus the whole of the gap between the opposed end faces can be easily reduced. Concerning the flexibility, the first and second seal materials each preferably have a tensile elasticity of 100 to 100000 MPa, more preferably of 1000 to 10000 MPa. The tensile elasticity was measured with AG-1 manufactured by Shimadzu Corporation according to JIS K 6301 under the conditions of a JIS No. 3 dumbbell, a span of 100 mm and a tension rate of 5 mm/minute.

In the production method, the opposed end faces of the optical films or protective film-attached optical films are preferably both substantially perpendicular to their front and back surfaces.

While the end faces to be opposed may have various shapes, the substantially perpendicularly-shaped end faces to be opposed are easily obtained by working and easily handled when they are combined to form a combined optical film.

In the step (1) of the production method, the optical films are preferably opposed to one another such that the gap between the opposed end faces has a width of 50 μm or less. If the gap has a relatively large width, the second side gap between the optical films cannot be sufficiently narrowed in the step (3) in some cases. Thus, the width is preferably as small as possible. The width is more preferably 40 μm or less, still more preferably 30 μm or less.

In the production method, polarizing plates are preferably used as the optical films.

In the production method, the optical films to be used may each include an optical film and an easily-releasable protective film provided on the front surface of the optical film and/or a separator provided on the back surface of the optical film with a pressure-sensitive adhesive layer interposed therebetween.

The production method may also include the step of: (6) separating the first seal material after the steps (1) to (4) and before, after or simultaneously with the step (5). Even when the first seal material is separated from the first side of the optical films, the opposed end faces are fixed by means of the second seal material to keep the narrowed gap in the combined optical film. In this fixed state, the first side of the combined optical film may be attached to any other member.

For example, the first side of the resulting combined optical film, from which the first seal material has been separated, may be bonded to a liquid crystal cell with a pressure-sensitive adhesive layer interposed therebetween to form a liquid crystal panel.

For example, the first side of the resulting combined optical film, from which the first seal material has been separated, may also be bonded to another optical film with a pressure-sensitive adhesive layer interposed therebetween to form a laminated optical film. A brightness enhancement film is preferably used as another optical film.

In the above aspect, for example, when the optical films each include an optical film, an easily-releasable protective film provided on the front surface of the optical film and a separator provided on the back surface of the optical film with a pressure-sensitive adhesive layer interposed therebetween, in the step (2), the first seal material may be bonded to the opposed portions on the separator side, in the step (4), the second seal material may be bonded to the opposed portions on the protective film side, and in the step (6), the first seal material may be separated together with the joined separators.

In this case, the separator side corresponds to the first side, while the protective film side corresponds to the second side. The pressure-sensitive adhesive layer is present on the first side and thus may be used for bonding to any other member.

In the above aspect, for example, when the optical films each include an optical film, an easily-releasable protective film provided on the front surface of the optical film and a separator provided on the back surface of the optical film with a pressure-sensitive adhesive layer interposed therebetween, in the step (2), the first seal material may be bonded to the opposed portions on the protective film side, in the step (4), the second seal material may be bonded to the opposed portions on the separator side, and in the step (6), the first seal material may be separated together with the joined protective films.

In this case, the protective film side corresponds to the first side, while the separator side corresponds to the second side. Since the pressure-sensitive adhesive layer is not present on the first side, another pressure-sensitive adhesive layer may be formed on the first side to be bonded to any other member.

The invention is also directed to a combined optical film produced by the production method.

The invention is also directed to an image display characterized by including the combined optical film.

The invention is also directed to an apparatus for producing a combined optical film including a plurality of optical films each having at least one end face at which the optical films are opposed to one another, including:

a first sealing mechanism that joins opposed portions of the optical films on a first side of each optical film, while end faces of the optical films are opposed to one another with a gap provided therebetween;

a concave pedestal that bends the joined opposed portions of the optical films such that the joined opposed portions become concave on a second side of each optical film where the first seal material is not bonded; and a second sealing mechanism that joins the opposed portions on the second side of each optical film where the first seal material is not bonded, while the joined optical films are bent.

The production apparatus may further include a separating mechanism that separates the first seal material, which is bonded by means of the first sealing mechanism, from the first side of each optical film after the opposed portions of the optical films are joined on the second side by means of the second sealing mechanism.

The production method of the invention can be efficiently achieved with the production apparatus.

According to the invention, a combined optical film with a narrowed gap between opposed end faces can be manufactured by a simple process. The combined optical film is prepared with the plurality of optical films. Thus, optical films with the desired size can be prepared using conventional optical films, and large optical films can be preferably produced. Since each optical film can be separately transported, the combined optical film allows easy transportation. The opposing technique allows recycling of residues (optical films) that have odd sizes and are conventionally handled as waste materials.

DESCRIPTION OF THE PREFERRED EMBODIMENTS

The method of the invention for producing the combined optical film is described below with reference to the drawings.

When the combined optical film is produced according to the invention, the sizes of the optical films to be combined are each adjusted depending on the size of the combined optical film to be produced. There is no particular limitation to the number of the optical films to be combined. While there is no limitation to the size of the combined optical film to be produced, a combined optical film of a large size of 65 inches or more (or with a width of 800 mm or more and a length of 1350 mm or more) is effectively produced. On the other hand, even when a relatively small combined optical film is produced, there is provided the advantage that each optical film can easily transported or transferred.

The method of the invention for producing a combined optical film including a plurality of optical films each having at least one end face at which the optical films are opposed to one another includes the steps of:

(1) opposing the end faces of the optical films to one another with a gap provided therebetween;

(2) bonding a first seal material to the opposed portions of the optical films on a first side of each optical film to join the optical films;

(3) bending the joined opposed portions of the optical films such that the joined opposed portions become concave on a second side of each optical film where the first seal material is not bonded and such that the gap is narrowed on the second side;

(4) bonding a second seal material to the opposed portions on the second side, while the joined optical films are bent such that the gap is narrowed on the second side; and (5) cancelling the bending of the joined optical films to make them flat.

Figure 1:
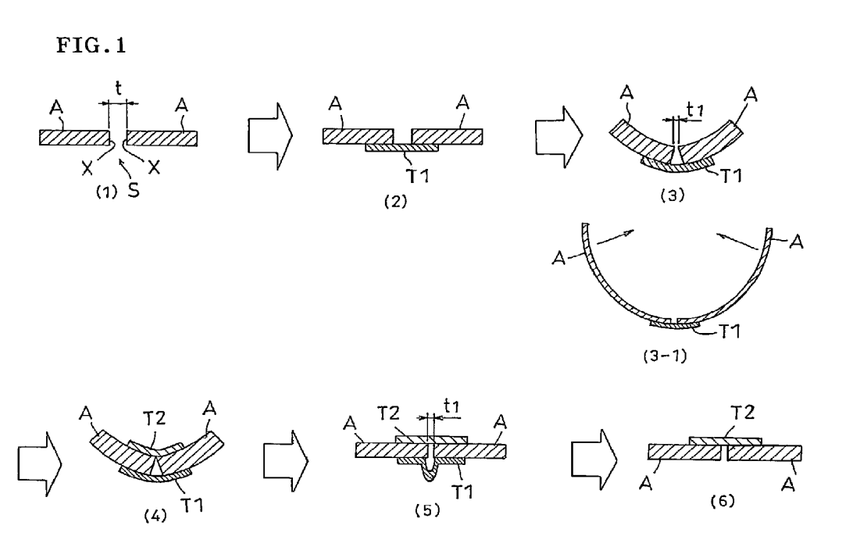
FIG. 1 is a schematic diagram showing an example of the method of the invention for producing a combined optical film.

For example, the method of the invention for producing the combined optical film may be performed as shown in FIG. 1.

FIG. 1 indicates reference numerals (1) to (5) corresponding to the steps (1) to (5). FIG. 1 shows cross-sectional views in the respective steps with respect to the combined optical film.

FIG. 1 illustrates a case where two optical films A each with an end face X to be opposed are combined and opposed to each other to form a combined optical film in which the gap s between the opposed end faces X is narrowed. The front and back surfaces of the optical film A are interchangeable, and any one side may be the front or back surface. The opposed end faces X are preferably processed with high precision by cutting, grinding or any other method.

While there is no particular limitation to the opposed end faces X in the combined optical film, each of the opposed end faces X may be substantially perpendicular to the front and back surfaces of the optical film A as shown in FIG. 1. Alternatively, each of the opposed end faces X may have a plane shape inclined from the front side to the back side of the optical film A. Any other end face form may also be employed.

The same optical films A are generally used to be combined. In each drawing, a pair of optical films A shown on the left and right sides are preferably the same.

Figure 2:
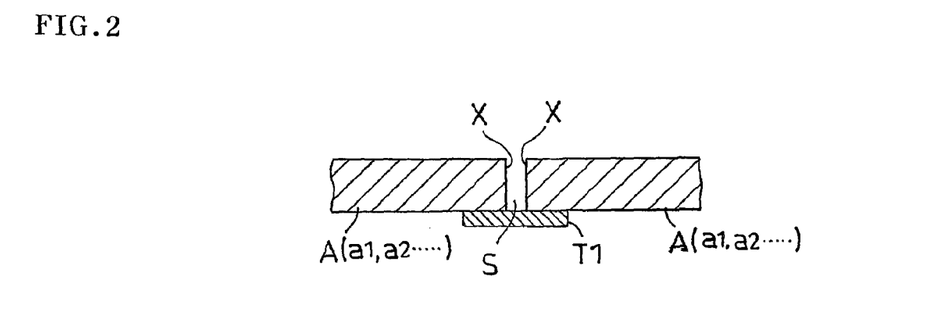
FIG. 2 is a cross-sectional view showing an example of the opposed optical films for use in the production method of the invention.
Figure 3:
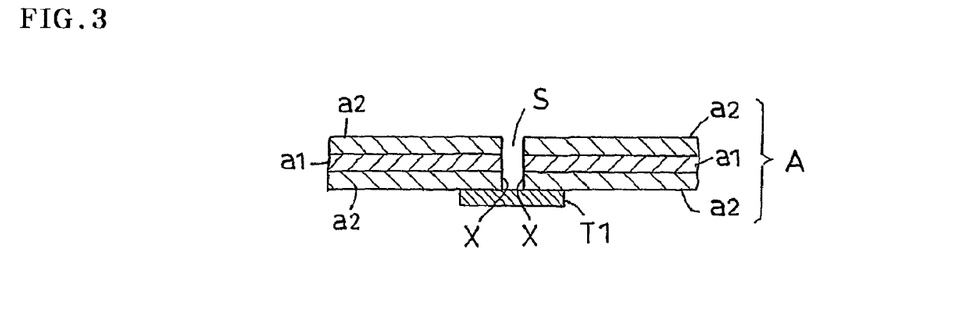
FIG. 3 is a cross-sectional view showing another example of the opposed optical films for use in the production method of the invention.
Figure 4:
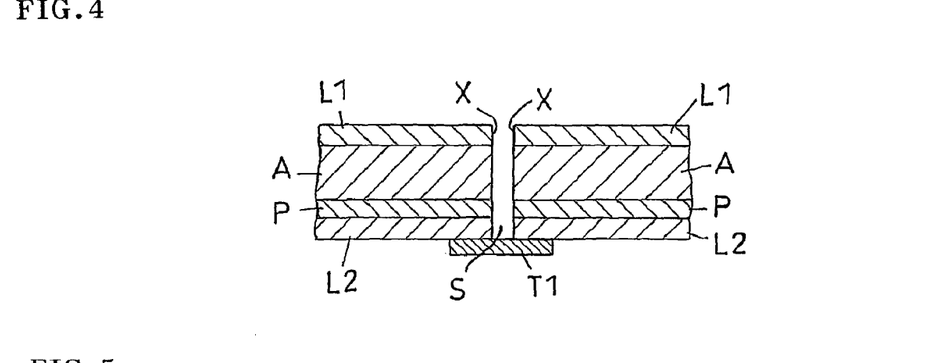
FIG. 4 is a cross-sectional view showing a further example of the opposed optical films for use in the production method of the invention.

The optical film A may be any of various types. FIG. 1 shows a case where a single layer is used for the optical film A. The optical film A may be a single layer or may be used in the form shown in each of FIGS. 2 to 4. The first seal material to be bonded in the step (2) is also shown in FIGS. 2 to 4. FIG. 2 illustrates an optical film A that is a laminate of two or more layers. FIG. 3 illustrates an optical film A including an optical film a1 and an optical a2 laminated on both sides of the optical film a1. In FIG. 3, for example, a1 represents a polarizer, and a2 represents a protective film for the polarizer, so that the optical film A is a polarizing plate including the polarizer and the protected film laminated on both sides of the polarizer. In FIG. 3, the lamination may use an adhesive or a pressure-sensitive adhesive, but such an adhesive is omitted from FIG. 3. Besides the examples described above, the optical film may be a retardation plate, an optical compensation film, a brightness enhancement film, or the like.

FIG. 4 shows an example of the optical film in which a protective film L1 and a separator L2 are provided on the optical film A. The optical film of FIG. 4 may also be subjected to the same process as shown in FIG. 1.

In the optical film shown in FIG. 4, an easily-releasable protective film L1 is provided on the front surface of the optical film A, and a separator L2 is provided on the back surface of the optical film A with a pressure-sensitive adhesive layer P interposed therebetween. While the protective film L1 and the separator L2 are provided on both sides of the optical film A in FIG. 4, any one of them may be provided one side.

The easily-releasable protective film L1 to be used is generally a laminate including a base film and an easily-releasable pressure-sensitive adhesive layer provided thereon. The separator L2 for the pressure-sensitive adhesive layer P can be separated and removed from the pressure-sensitive adhesive P at the adhesive interface. In contrast, the protective film L1 is generally a laminate of a base film and an easily-releasable pressure-sensitive adhesive layer, in which the pressure-sensitive adhesive layer can be separated and removed together with the base film.

FIGS. 1 to 4 each show a case where two optical films A are combined. Alternatively, two or more optical films A may be combined vertically and horizontally (four or more optical films A in total).

In the production method of the invention, the step (1) is first performed. In the step (1), the end faces X of the optical films A are opposed to one another with a gap s provided therebetween. In general, the width t of the gap s between the opposed end faces X as shown in FIG. 1 (1) is preferably 50 µm or less as stated above.

The step (2) is then performed. In the step (2), a first seal material T1 is bonded to a first side (lower side in FIG. 1) of each optical film A at the opposed portions of the optical films to join the optical films A. The first seal material T1 may be bonded to the whole or one or more parts of the opposed portions of the optical films A and preferably bonded to the whole of the opposed portions. The steps (1) and (2) may be sequentially performed. Alternatively, one of the optical films A may be placed on the first seal material T1, and then the other optical film A may be placed on the first seal material T1, so that the steps (1) and (2) can be performed at the same time.

The step (3) is then performed. In the step (3), the joined opposed portions of the optical films A are bent such that the joined opposed portions becomes concave on a second side (upper side in FIG. 1) of each optical film A where the first seal material T1 is not bonded and such that the width t1 of the gap s on the second side is narrowed. The degree of the bending toward the second side may be appropriately determined depending on the type of the optical film A and the width t of the gap s. The degree of the bending is preferably such that the gap s on the second side substantially disappears. As shown in FIG. 1 (3-1), the bending may be performed by bending the second side of each optical film A to the inside. In FIG. 1 (3), the width t1 of the gap s on the second side almost disappears. The width t1 of the gap s on the second side is preferably reduced to 5 µm or less, more preferably to 2 µm or less.

The step (4) is then performed. FIG. 1 (4) shows the step (4). In the step (4), a second seal material T2 is bonded to the opposed portions on the second side, while the joined optical films A are bent such that the gap s is narrowed on the second side. The second seal material T2 fixes the width t1 of the gap s on the second side.

The step (5) is then performed. FIG. 1 (5) shows the step (5). In the step (5), the bending of the joined optical films A is cancelled so that they are made flat. Even when they are made flat, the second side width t1 of the gap s remains narrow by means of the second seal material T2. On the other hand, the first side width of the gap can be made substantially equal to the second side width t1 of the gap s by making them flat. In FIG. 1 (5), the first seal material T1 is bent by making them flat so that the first side width of the gap s becomes substantially equal to the second side width t1 of the gap s. Thus, the width of the gap between the opposed end faces X is reduced.

As described above, the first and second seal materials to be used is preferably flexible. The first and second seal materials are used to fix the optical films and thus each preferably include a base film and a pressure-sensitive adhesive layer provided thereon. Examples of the base material for the first and second seal materials include polyolefin base materials such as polypropylene and polyethylene, polyester base materials such as polyethylene terephthalate and polyethylene naphthalate, polyamide base materials such as nylon 6 and nylon 66, cellulose base materials such as paper, polyimide base materials, polyvinyl chloride base materials, and polystyrene base materials. Examples of the pressure-sensitive adhesive layer include known pressure-sensitive adhesives such as silicone/acrylic pressure-sensitive adhesives, rubber pressure-sensitive adhesives and vinyl pressure-sensitive adhesives. Specific examples of the first and second seal materials include a polyimide tape manufactured by Nitto Denko Corporation (Polyimide Pressure-Sensitive Adhesive Tape No. 360A) and a light packing tape manufactured by Sekisui Chemical Co., Ltd. (Cellophane Tape No. 252). In general, the first and second seal materials each preferably have a thickness of about 40 to about 100 µm, because of their easy handling. The width of each of the first and second seal materials to be used is larger than the width of the gap s between the opposed portions of the optical films A. The first and second seal materials are preferably transparent such that the opposed portions can be observed.

The combined optical film is obtained as described above. The resulting combined optical film may be used in various applications. Before use in various applications, the first seal material should be separated. The step of separating the first seal material T1 is shown as step (6) in FIG. 1 (6). The step (6) may be performed when a combined optical film is once obtained after the steps (1) to (5) are completed. Alternatively, when a series of processes including the step (6) are performed in the method of production of the combined optical film, the step (6) may be performed after the step (5) or otherwise between the steps (4) and (5) or together with the step (5) at the same time.

Figure 5:
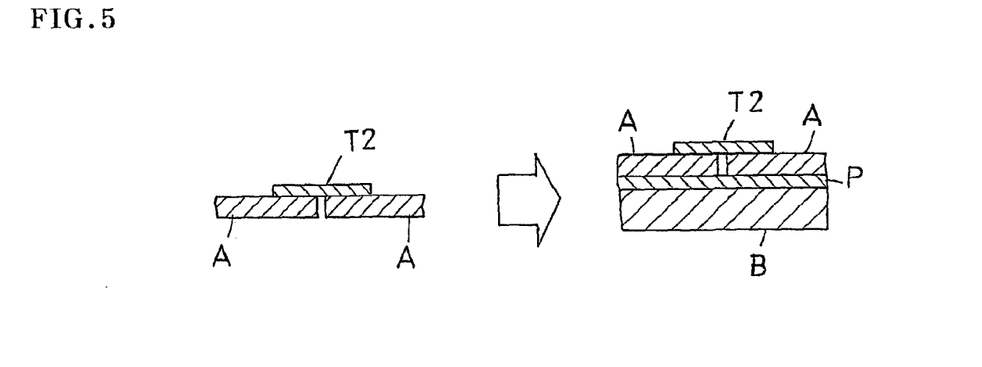
FIG. 5 is a schematic diagram showing an example where the combined optical film obtained by the production method of the invention is applied to another member.
Figure 6A:
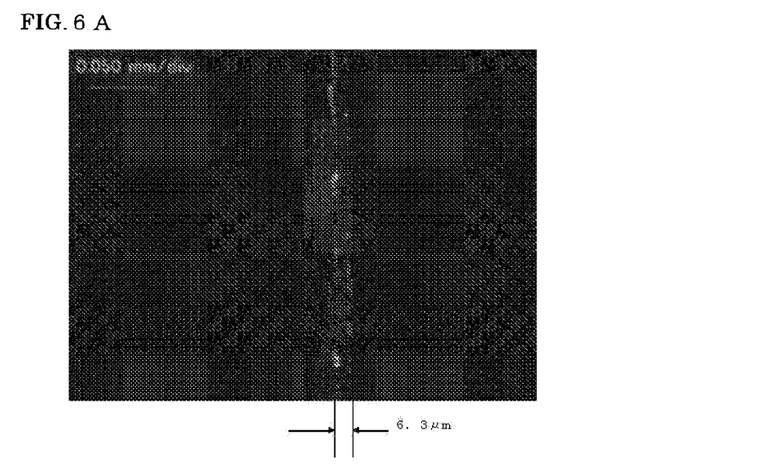
FIG. 6A is an image showing a gap in a combined optical film obtained in Example 1.
Figure 6B:
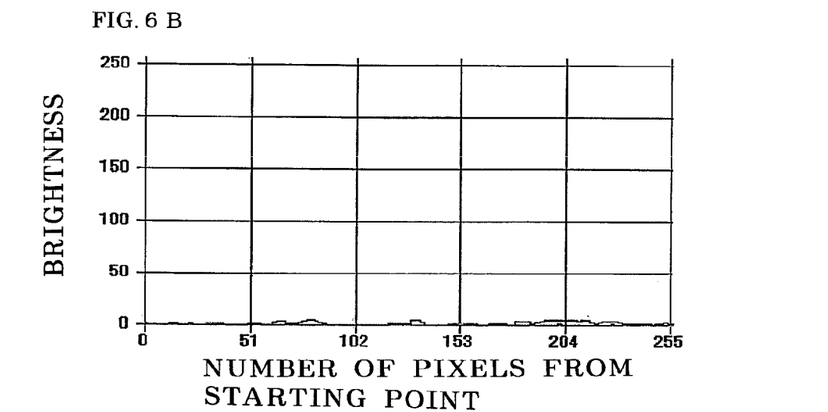
FIG. 6B is an RGB graph with respect to the combined optical film obtained in Example 1.
Figure 7:
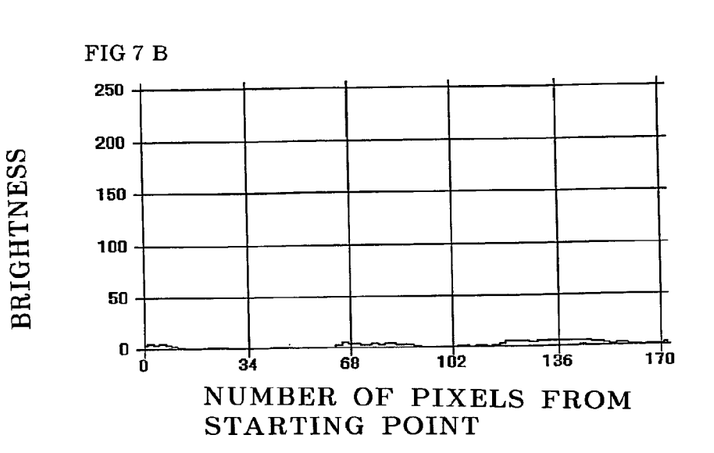
FIG. 7A is an image showing a gap in a combined optical film obtained in Example 2.
FIG. 7B is an RGB graph with respect to the combined optical film obtained in Example 2.
Figure 7A:
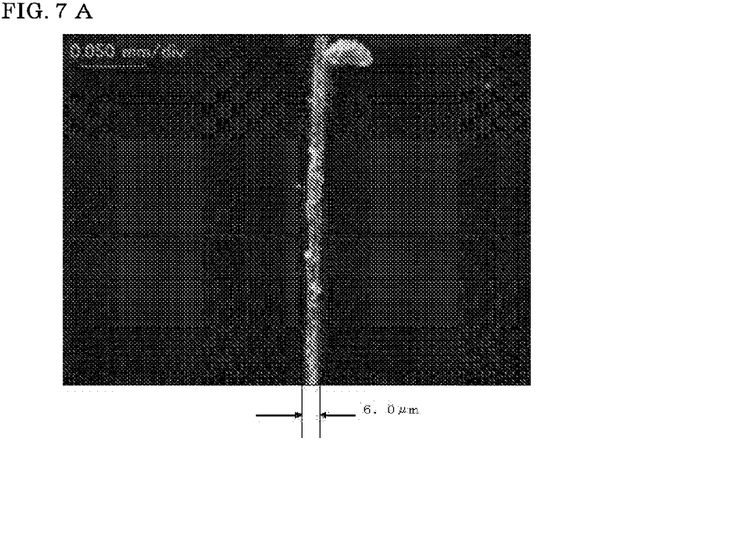
Figure 8:
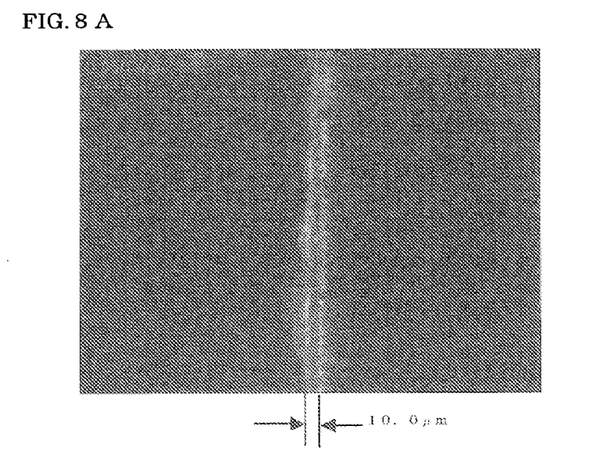
FIG. 8A is an image showing a gap in a combined optical film obtained in Example 3.
FIG. 8B is an RGB graph with respect to the combined optical film obtained in Example 3.
Figure 9A:
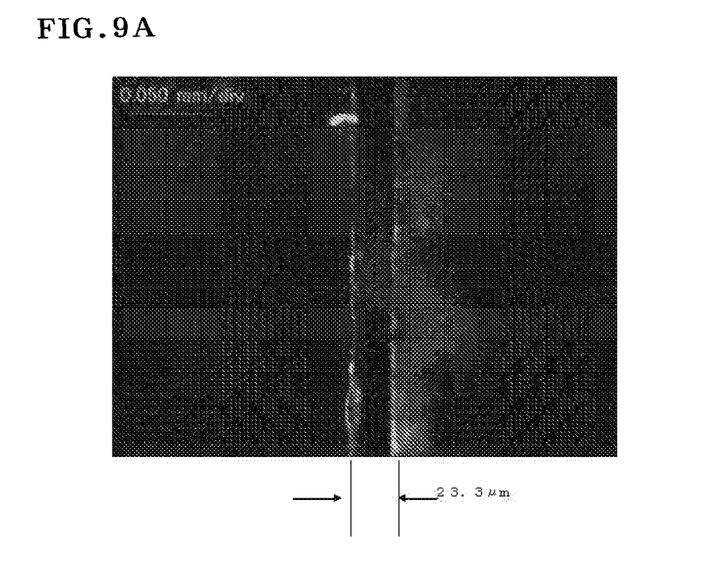
FIG. 9A is an image showing a gap in a combined optical film obtained in Comparative Example 1.
Figure 9B:
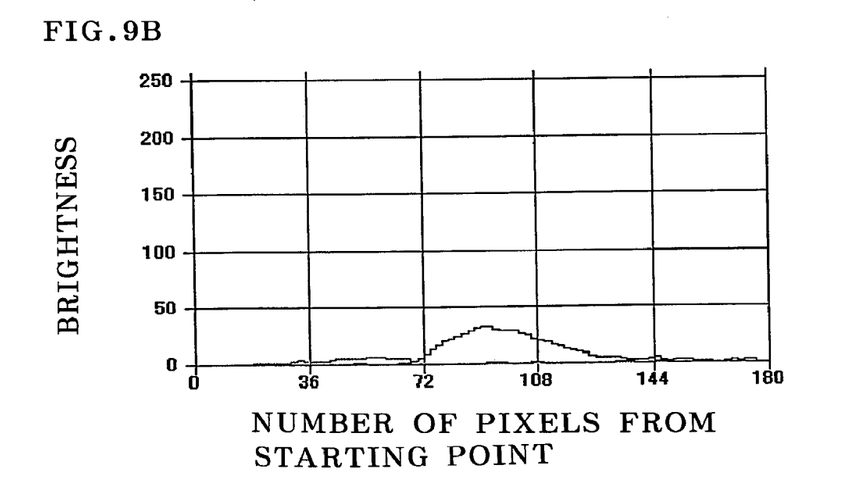
FIG. 9B is an RGB graph with respect to the combined optical film obtained in Comparative Example 1.

The combined optical film obtained by separating the first seal material in the step (6) may be used in various applications. As shown in FIG. 5, for example, the surface (lower side) of the combined optical film, from which the first seal material has been separated, may be bonded to another member B with a pressure-sensitive adhesive layer P interposed therebetween. For example, another member may be a liquid crystal cell, and in such a case, a liquid crystal panel may be produced. Alternatively, another member may be another optical film, and in such a case, a laminated optical film may be produced.

In a mode including the step (6), an easily-releasable protective film L1 may be provided on the front surface of the optical film A, while a separator L2 may be provided on the back surface of the optical film A with a pressure-sensitive adhesive layer P interposed therebetween. In this case, the first seal material T1 may be separated together with the joined separators L2. In this case, the first seal material T1 is bonded to the separator L2 side of the opposed portions in the step (2), and the second seal material T2 is bonded to the protective film L1 side of the opposed portions in the step (4). In the resulting combined optical film, the pressure-sensitive adhesive layer P remains on the side from which the first seal material T1 has been separated, so that the pressure-sensitive adhesive layer P can be bonded to another member. A liquid crystal cell is preferably used as another member.

Alternatively, the first seal material T1 may be bonded to the protective films L1, contrary to that shown in FIG. 4. In this case, the seal material T1 may be separated together with the joined protective films L1. In this case, the first seal material T1 is bonded to the protective film L1 side of the opposed portions in the step (2), and the second seal material T2 is bonded to the separator L2 side of the opposed portions in the step (4). In the resulting combined optical film, another pressure-sensitive adhesive layer P may be formed on the side from which the first seal material T1 has been separated, so that the pressure-sensitive adhesive layer P can be bonded to another member. Any other optical film is preferably used as another member.

The combined optical film according to the invention may be produced using a manufacturing apparatus that includes:

a first sealing mechanism that joins opposed portions on a first side of each optical film, while end faces of the optical films are opposed to one another with a gap provided therebetween;

a concave pedestal that bends the joined opposed portions of the optical films such that the joined opposed portions become concave on a second side of each optical film where the first seal material is not bonded; and a second sealing mechanism that joins the opposed portions on the second side of each optical film where the first seal material is not bonded, while the joined optical films are bent.

The first sealing mechanism is used in the step (2). The concave pedestal is used in the step (3). The second sealing mechanism is used in the step (4). When the step (6) is included, a separating mechanism may also be provided that separates the first seal material, which is bonded by means of the first sealing mechanism, from the first side of each optical film after the opposed portions of the optical films are joined on the second side by means of the second sealing mechanism.

The optical film used for the combined optical film is specifically described below.

Any type of optical film for use in forming image displays such as liquid crystal displays may be used without particular limitations. For example, the optical film may be a polarizing plate. In generally, a polarizing plate, which comprises a polarizer and a transparent protective film provided on one or both sides of the polarizer, is used. Alternatively, a polarizer and a transparent protective film may be used as individual optical films.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate or zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin having good transparency, mechanical strength, thermal stability, water-blocking properties, isotropy, or the like may be used a material for forming a transparent protective film on one or both sides of the polarizer. Examples of such a thermoplastic resin include cellulose resins such as triacetylcellulose, polyester resins, polyether sulfone resins, polysulfone resins, polycarbonate resins, polyamide resins, polyimide resins, polyolefin resins, (meth) acrylic resins, cyclic polyolefin resins (norbornene resins), polyarylate resins, polystyrene resins, polyvinyl alcohol resins, and any combinations thereof. The polarizer and the transparent protective film are generally bonded together with an adhesive layer. Thermosetting resins or ultraviolet curing resins such as (meth)acrylic, urethane, acrylic urethane, epoxy, or silicone resins may be used for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is less than 50% by weight, high transparency and other properties inherent in the thermoplastic resin can fail to be sufficiently exhibited.

The transparent protective film may also be a polymer film as disclosed in JP-A No. 2001-343529 (WO01/37007), such as a resin composition including: (A) a thermoplastic resin having a substituted and/or unsubstituted imide group on its side chain; and (B) a thermoplastic resin having a substituted and/or unsubstituted phenyl and nitrile groups on its side chain. Examples thereof include films of a resin composition containing an isobutylene-N-methylmaleimide alternating copolymer and an acrylonitrile-styrene copolymer. The film may be a product formed by mixing and extruding the resin composition. These films have relatively low retardation and relatively low photoelastic coefficient so that they can cancel defects such as unevenness due to distortion of the polarizing plate. These films also have low water-vapor permeability and thus high durability to heat and humidity.

The thickness of the transparent protective film may be determined as appropriate. In view of workability such as strength and handleability, thin film properties and so on, the thickness of the transparent protective film is generally from about 1 to about 500 μm, particularly preferably from 1 to 300 μm, more preferably from 5 to 200 μm. The transparent protective film with a thickness of 5 to 150 μm is particularly suitable.

When a transparent protective film is provided on both sides of the polarizer, transparent protective films made of the same polymer material or different polymer materials may be used on the front and back sides, respectively.

At least one resin selected from a cellulose resin, a polycarbonate resin, a cyclic polyolefin resin, and a (meth)acrylic resin is preferably used for the transparent protective film.

The cellulose resin includes an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred among these resins. Triacetyl cellulose has many commercially available sources and is advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with a relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for about 3 to about 10 minutes) and then separating the base film; and a method that includes coating a general cellulose resin film with a solution of a norbornene resin, a (meth) acrylic resin or the like in a solvent such as cyclopentanone or methyl ethyl ketone, drying the coated film by heating (for example, at 80 to 150° C. for about 3 to about 10 minutes), and then separating the coating.

The cellulose resin film with a relatively small thickness direction retardation to be used may be a fatty acid cellulose resin film with a controlled degree of fat substitution. Triacetyl cellulose for general use has a degree of acetic acid substitution of about 2.8. Preferably, however, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Cyclic polyolefin resins have various commercially available sources. Examples thereof include Zeonex (trade name) and Zeonor (trade name) series manufactured by Nippon Zeon Co., Ltd., Arton (trade name) series manufactured by JSR Corporation, Topas (trade name) series manufactured by Ticona, and Apel (trade name) series manufactured by Mitsui Chemicals, Inc.

The (meth)acrylic resin preferably a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the invention are not reduced. Examples of such a (meth)acrylic resin include poly(meth)acrylate such as poly(methyl methacrylate), methyl methacrylate-(meth) acrylic acid copolymers, methyl methacrylate-(meth)acrylate ester copolymers, methyl methacrylate-acrylate ester-(meth) acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl(meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used as (meth)acrylic resins, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

In the formula, $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has a front retardation of less than 40 nm and a thickness direction retardation of less than 80 nm. The front retardation Re is expressed by the formula Re=(nx−ny)d, the thickness direction retardation Rth is expressed by the formula Rth=(nx−nz)d, and the Nz coefficient is expressed by the formula Nz=(nx−nz)/(nx−ny), wherein nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Concerning the invention, retardation values were measured at a wavelength of 590 nm with a retardation analyzer (KOBRA 21-ADH (trade name) manufactured by Oji Scientific Instruments) based on the principle of parallel nicols rotation method. The transparent protective film should preferably be as colorless as possible. The transparent protective film to be used preferably has a retardation of −90 nm to +75 nm in the film thickness direction. If the transparent protective film to be used has a retardation (Rth) of −90 nm to +75 nm in the thickness direction, coloration (optical coloration) of the polarizing plate, which would otherwise be caused by the transparent protective film, can be almost eliminated. The thickness direction retardation (Rth) is more preferably from −80 nm to +60 nm, particularly preferably from −70 nm to +45 nm.

Alternatively, the transparent protective film to be used may be a retardation plate having a front retardation of 40 nm or more and/or a thickness direction retardation of 80 nm or more. The front retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness. Alternatively, the retardation plate described later may also be used.

The above-mentioned polarizer and the protective film are usually adhered with aqueous adhesives or the like. As the aqueous adhesives, isocyanate based adhesives, polyvinyl alcohol based adhesives, gelatin based adhesives, vinyl based latex based, aqueous polyurethane based adhesives, aqueous polyester based adhesives, and etc. may be exemplified. Besides the above, the adhesive for bonding the polarizer to the transparent protective film may be an ultraviolet-curable adhesive, an electron beam-curable adhesive or the like.

As the opposite side of the polarizing-adhering surface of the transparent protective film, a film treated with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles (including beads) comprising cross-linked or non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 40 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

Further an optical film of the invention may be used as other optical layers, such as a reflective plate, a transflective plate, a retardation plate (a half wavelength plate and a quarter wavelength plate included), and a viewing angle compensation film, a brightness enhancement film, which may be used for formation of a liquid crystal display etc. These are used in practice as an optical film, or as one layer or two layers or more of optical layers laminated with polarizing plate.

Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarizing plate or circularly polarizing plate on which the retardation plate is laminated to the polarizing plates will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without coloring mentioned below by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyaryl sulfones, polyamides, polyimides, polyolefins, polyvinyl chlorides, cellulose type polymers, norbornene type resins, bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc.
may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, are obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates are laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate include a retardation plate, an orientation film of a liquid crystal polymer, or an orientation layer of a liquid crystal polymer supported on a transparent substrate. Ordinary retardation plate is a polymer film having birefringence property that is processed by uniaxially stretching in the plane direction, while the viewing angle compensation retardation plate used is a bidirectional stretched film having birefringence property that is processed by biaxially stretching in the plane direction, or a film, which is controlled the refractive index in the thickness direction, that is processed by uniaxially stretching in the plane direction and is processed by stretching in the thickness direction, and inclined orientation film. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. As raw material polymers of the retardation plate, the same polymers the described above is used. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; a film that has the characteristics of reflecting a circularly polarized light with either left-handed or right-handed rotation and transmitting other light, such as an aligned film of cholesteric liquid-crystal polymer or a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing process ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

A pressure-sensitive adhesive layer for adhering to any other component such as a liquid crystal cell may also be formed on one or both sides of the optical film. Such a pressure-sensitive adhesive layer may also be used for the lamination of optical films, and a separator may be provided on the pressure-sensitive adhesive layer. In FIG. 4, a separator L2 is provided for a pressure-sensitive adhesive layer P.

As pressure-sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred o A pressure-sensitive adhesive layer may also be provided on one side or both sides of a polarizing plate or an optical film as a layer in which pressure-sensitive adhesives with different composition or different kind etc. are laminated together. When provided on both sides, the pressure-sensitive adhesive layers may differ in composition, type, thickness or the like between the front and back sides of the polarizing plate or the optical film. Thickness of a pressure-sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that are coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In order to protect the optical film itself, an easily peelable protective film may be provided on the optical film. In FIG. 4, an easily peelable protective film L1 is provided.

While the protective film may be formed only of a base film, it generally comprises a base film and a pressure-sensitive adhesive layer that is formed on the base film such that it can be peeled together with the base film from the optical film.

In addition, in the present invention, ultraviolet absorbing property may be given to the above-mentioned optical film, and the pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

The combined optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the combined optical film and optionally other components such as a lighting system and incorporating a driving circuit according to any conventional technique, except that the combined optical film or laminated combined film of the invention is used. Any type of liquid crystal cell may also be used such as a TN type, an STN type and a n type.

Suitable liquid crystal displays, such as liquid crystal display with which the combination optical film has been located at one side or both sides of the liquid crystal cell, and with which a backlight or a reflective plate is used for a lighting system may be manufactured. In this case, the combination optical film or the laminated combination optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed Subsequently, organic electro luminescence equipment (organic EL display) will be explained. The optical film (including the polarizing plate) of the present is applied to the organic EL display. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and many compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

EXAMPLES

The invention is more specifically described with reference to the examples below which are not intended to limit the scope of the invention.

Example 1

Optical Film

An optical film manufactured by Nitto Denko Corporation (NXP-EF/SEGK-ST03) was used. This film is a retardation layer-laminated polarizing plate including a polarizing plate and a retardation layer formed on one side of the polarizing plate, in which a separator, a pressure-sensitive adhesive layer, the polarizing plate, the retardation layer, and a protective film are laminated in this order.

One of the end faces (length side) of the optical film (100 mm in length, 50 mm in width, 300 µm in thickness) was processed such that the processed end face was in the same direction as the normal direction of the optical film.

First and Second Seal Materials

The first and second seal materials used were each a polyimide tape manufactured by Nitto Denko Corporation (Polyimide Pressure-Sensitive Adhesive Table No. 360A) with a width of 10 mm and a thickness of 53 μm. The polyimide tape has a tensile elasticity of 1700 MPa.

Method for Producing Combined Optical Film

Step (1): The processed end faces (vertical end faces) of the optical films were opposed to each another on a polystyrene sheet (500 μm in thickness); The width t of the gap s between the opposed end faces was 25 μm.

Step (2): The first seal material was bonded from the upper side (on a first side) to the whole of the opposed portions of the optical films so that the protective film-attached polarizing plates were joined.

Step (3): The joined optical films were turned upside down so that the first seal material faced downward, and then the joined optical films were bent by pressing them against the concave part of a concave pedestal such that they became concave on the upper side (a second side) and such that the gap on the second side was narrowed; As a result, the gap s between the opposed end faces was narrowed on the second side.

Step (4): The second seal material was bonded to the second side of the opposed portions, while the joined optical films were bent.

Step (5): The bending of the joined optical films was cancelled so that they were made flat.

After the above steps, a combined optical film was obtained.

Example 2

A combined optical film was obtained using the process of Example 1, except that a light packing tape manufactured by Sekisui Chemical Co., Ltd. (Cellophane Tape No. 252, 10 mm in width and 51 μm in thickness) was used as both of the first and second seal materials. The cellophane tape has a tensile elasticity of 2300 MPa.

Example 3

A combined optical film was obtained using the process of Example 1, except that the width t of the gap s between the opposed end faces was set at 43 μm in the step (1).

Comparative Example 1

A combined optical film was obtained using the process of Example 1, except that the steps (3) to (5) with respect to bending were not performed.

Evaluations

The combined optical films obtained in the examples and the comparative example were each evaluated as described below. The results are shown in Table 1.

Method for Visual Observation

A lower plate side optical film was removed form a liquid crystal panel (AQUOS, 26 inches, LC-26BD1, manufactured by Sharp Corporation), and the combined optical film obtained in each example was attached in place of it to form a new liquid crystal panel. After turned on, the liquid crystal panel was allowed to stand for 30 minutes and then connected to PC to display black on the whole of the screen, when visual observation at a location 1 m distant from the front of the opposed portions was performed in a darkroom according to the following criteria: ○: there was no light leakage; Δ: there was slight light leakage; x: there was some light leakage.

Method for Measuring the Gap

Measurement was performed from the back side (lower plate side) of the liquid crystal panel with VH-5000 (equipped with a middle magnification zoom lens VH-Z150) manufactured by Keyence Corporation. The measurement with the VH-5000 was performed under the following conditions:
Easy Mode: On
White Balance: Auto
Gain: Auto
Shutter: Auto
Light: Max
Image: Standard
Lens Magnification: 800×
Aperture Number: 9
Averaging Measurement (4 times, divided by 4)
Focus Position Upper Portion of the Gap.

The image data were stored as BMP files. The gap between the opposed portions was determined from the stored BMP files using the parallel line mode of the main measurement of a digital image measurement analysis software VH-H1A5. The gap images of Examples 1, 2 and 3 and Comparative Example 1 are shown in FIGS. 6A, 7A, 8A, and 9A, respectively.

Method for Numerical Evaluation of Appearance

The liquid crystal panel was turned on and then allowed to stand for 30 minutes. Thereafter, the liquid crystal panel was connected to PC to display black on the whole of the screen, when measurement was performed from the front side (upper plate side) of the liquid crystal panel with VH-5000 (equipped with a middle magnification zoom lens VH-Z150) manufactured by Keyence Corporation. The measurement with the VH-5000 was performed under the following conditions:
Easy Mode: Off
White Balance Auto
Gain: Auto
Shutter: Auto
Light: Off
Image: Standard
Magnification of Measurement: 150×
Aperture Number: 9
Averaging Measurement (4 times, divided by 4)
Focus Position The color filter at the gap portion.

The image data were stored as BMP files. Light leakage from the opposed portions was determined from the stored BMP files by reading the maximum of the brightness with respect to each of RGB in the line profile produced with the digital image measurement analysis software VH-H1A5. RGB graphs with respect to Examples 1, 2 and 3 and Comparative Example 1 are shown in FIGS. 6B, 7B, 8B, and 9B, respectively.

TABLE 1

|  | Gap (μm) | Appearance | R Brightness | G Brightness | B Brightness |
|---|---|---|---|---|---|
| Example 1 | 6.8 | ○ | 3.5 | 0.3 | 3.7 |
| Example 2 | 6.0 | ○ | 3.8 | 0.5 | 4.3 |
| Example 3 | 10.0 | Δ | 0.7 | 0 | 23.7 |
| Comparative Example 1 | 23.3 | x | 1.0 | 5.2 | 33.3 |

What is claimed is:
1. An apparatus for producing a combined optical film comprising a plurality of optical films each having at least one end face at which the optical films are opposed to one another, comprising:
 a first sealing mechanism that joins opposed portions of the optical films on a first side of each optical film, while end faces of the optical films are opposed to one another with a gap provided therebetween;

a concave pedestal that bends the joined opposed portions of the optical films such that the joined opposed portions become concave on a second side of each optical film where the first seal material is not bonded; and a second sealing mechanism that joins the opposed portions on the second side of each optical film where the first seal material is not bonded, while the joined optical films are bent.

2. The apparatus according to claim 1, further comprising a separating mechanism that separates the first seal material, which is bonded by means of the first sealing mechanism, from the first side of each optical film after the opposed portions of the optical films are joined on the second side by means of the second sealing mechanism.

3. A method for producing a laminated optical film, comprising
- (i) providing the surface of a combined optical film comprising a plurality of optical films each having at least one end face at which the optical films are opposed to one another,
- wherein the combined optical film has been obtained by a method comprising the steps of:
  - (1) opposing the end faces of the optical films to one another with a gap provided therebetween;
  - (2) bonding a first seal material to the opposed portions of the optical films on a first side of each optical film to join the optical films;
  - (3) bending the joined opposed portions of the optical films such that the joined opposed portions become concave on a second side of each optical film where the first seal material is not bonded and such that the gap is narrowed on the second side;
  - (4) bonding a second seal material to the opposed portions on the second side, while the joined optical films are bent such that the gap is narrowed on the second side;
  - (5) cancelling the bending of the joined optical films to make them flat, and
  - (6) separating the first seal material after the steps (1) to (4) and before, after or simultaneously with the step (5),
- wherein the optical films each comprises an optical film, an easily-releasable protective film provided on the front surface of the optical film and a separator provided on the back surface of the optical film with a pressure-sensitive adhesive layer interposed therebetween,
- in the step (2), the first seal material is bonded to the opposed portions on the separator side,
- in the step (4), the second seal material is bonded to the opposed portions on the protective film side, and in the step (6), the first seal material is separated together with the joined separators,
- wherein the first seal material has been separated from the combined optical film; and
- (ii) bonding the surface of the combined optical film to another optical film with a pressure-sensitive adhesive layer interposed therebetween.

4. A method for producing a laminated optical film, comprising
- (i) providing the surface of a combined optical film comprising a plurality of optical films each having at least one end face at which the optical films are opposed to one another,
- wherein the combined optical film has been obtained by a method comprising the steps of:
  - (1) opposing the end faces of the optical films to one another with a gap provided therebetween;
  - (2) bonding a first seal material to the opposed portions of the optical films on a first side of each optical film to join the optical films;
  - (3) bending the joined opposed portions of the optical films such that the joined opposed portions become concave on a second side of each optical film where the first seal material is not bonded and such that the gap is narrowed on the second side;
  - (4) bonding a second seal material to the opposed portions on the second side, while the joined optical films are bent such that the gap is narrowed on the second side;
  - (5) cancelling the bending of the joined optical films to make them flat, and
  - (6) separating the first seal material after the steps (1) to (4) and before, after or simultaneously with the step (5),
- wherein the optical films each comprises an optical film, an easily-releasable protective film provided on the front surface of the optical film and a separator provided on the back surface of the optical film with a pressure-sensitive adhesive layer interposed therebetween,
- in the step (2), the first seal material is bonded to the opposed portions on the protective film side,
- in the step (4), the second seal material is bonded to the opposed portions on the separator side, and
- in the step (6), the first seal material is separated together with the joined protective films,
- wherein the first seal material has been separated from the combined optical film; and
- (ii) bonding the surface of the combined optical film to another optical film with a pressure-sensitive adhesive layer interposed therebetween.

* * * * *